3,087,938
17α-CHLORO AND 17α-BROMO-PROGESTERONES
Hans Reimann, Bloomfield, and David H. Gould, Leonia,
N.J., assignors to Schering Corporation, Bloomfield,
N.J., a corporation of New Jersey
No Drawing. Filed Aug. 2, 1961, Ser. No. 128,681
6 Claims. (Cl. 260—397.3)

This invention relates to novel, therapeutically useful 3,20-diketopregnanes having an unsaturation in the A-ring, and to methods for their manufacture. In particular, this invention relates to 17α-substituted-9α,11β-dihalogeno derivatives of A-ring unsaturated pregnane-3,20-diones which exhibit valuable progestational properties.

Novel pregnanes prepared by the process of our invention are the compounds represented by the following formula:

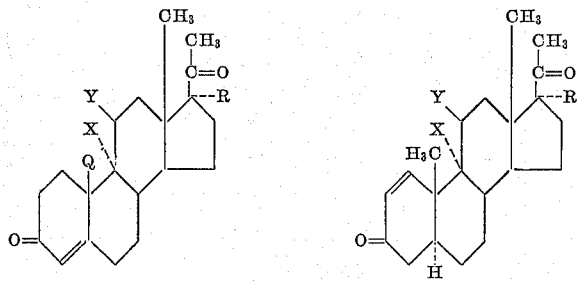

and

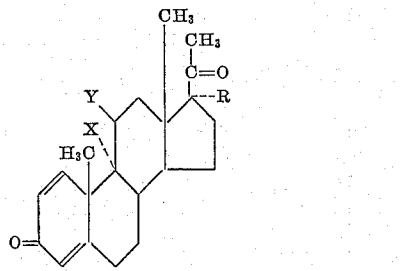

wherein X is a halogen having an atomic weight greater than 19; Y is a halogen having an atomic weight less than 126 and being at least as electronegative as X; Q is a member of the group consisting of hydrogen and methyl; and R is a member of the group consisting of methyl, halogen of atomic weight greater than 19 and less than 126, hydroxy and acyloxy. Our novel compounds are thus 9α,11β-dihalogeno derivatives of 17α-substituted progesterones, 17α-substituted-19-norprogesterones, 17α-substituted-1-allopregnene-3,20-diones and 17α-substituted-1,4-pregnadiene-3,20-diones.

Illustrative of the 17α-acyl groups in the 17α-acyloxy derivatives contemplated by our invention are lower alkanoates such as formate, acetate, propionate, butyrate, isobutyrate, valerate, isovalerate, pivalate, caproate, isocaproate, emanthate; substituted alkanoates such as β-cyclopentylpropionate, cyclohexylacetate, ethoxyacetate, phenylacetate, phenoxyacetate; unsaturated acyl radicals such as acrylate and crotonate; aromatic acyl radicals such as benzoate and toluate, as well as the residues of dibasic acids such as succinate and phthalate and of fatty acids such as undecanoate and laurate. The term "acyloxy" thus includes acyl radicals of monocarboxylic and dicarboxylic acids containing up to 12 carbon atoms.

As stated heretofore, the 11β-halogen present in a compound of the general formula or an analog thereof, must be at least as electronegative as the halogen present in the 9α-position; fluorine being the most electronegative halogen, and iodine the least electronegative. Thus, a progesterone derivative of our invention containing a 9α-chloro group may possess an 11β-chloro or an 11β-fluoro group but cannot contain an 11β-iodo or 11β-bromo group. This artificial restriction is imposed in view of the limitation of the manufacturing process.

Typical derivatives contemplated by our invention are progesterones such as 9α,11β-dichloro-17α-hydroxyprogesterone and 9α-bromo-11β-chloro-17α-hydroxyprogesterone and the 17-acetate and 17-caproate esters thereof, as well as other 17-substituted progesterones such as 9α,11β,17α-trichloroprogesterone, 9α-bromo-11β-fluoro-17α-chloroprogesterone, 9α,17α-dichloro-11β-fluoroprogesterone, 9α,-11β-dichloro-17α-bromoprogesterone, 9α-iodo-11β-chloro-17α-methylprogesterone, 9α,11β-dichloro-17α-methylprogesterone; and include their 1-dehydro analogs and 19-norprogesterones such as 9α,11β-dichloro-17α-hydroxy-19-norprogesterone 17-(β-cyclopentylpropionate) and 9α-bromo-11β-fluoro-17α-hydroxy-19-norprogesterone 17-acetate, and 1-allopregnene derivatives exemplified by 9α,11β-dichloro-17α-hydroxy-1-allopregnene-3,20-dione 17-acetate and 9α-bromo-11β-chloro-17α-hydroxy-1-allopregnene-3,20-dione 17-acetate. Although our compounds (with the exception of the 17-hydroxy substituted compounds which are valuable as intermediates) are, in general, valuable progestins, the 17α-acyloxy-dihalogenated progesterones of the general formula are the preferred species and, in particular, 9α,11β-dichloro-17α-hydroxyprogesterone 17-acetate.

Our novel compounds are prepared by reacting a 4,9(11)-pregnadiene-3,20-dione substituted at the 17-carbon by hydroxy, acyloxy, halogen or methyl (or a similarly substituted 1,4,9(11)-pregnatriene-3,20-dione or 1,9(11)-allopregnadiene-3,20-dione) with a suitable halogenating agent. The starting compounds utilized in this invention are therefore exemplified by compounds such as 17α-hydroxy-4,9(11)-pregnadiene-3,20-dione, 17α-acetoxy-4,9(11)-pregnadiene-3,20-dione, 17α-methyl-4,9(11)-pregnadiene-3,20-dione, 17α-bromo-4,9(11)-pregnadiene-3,20-dione, 17α-chloro-4,9(11)-pregnadiene-3,20-dione as well as the 1-dehydro analogs of the foregoing, and pregnadienes such as 17α-hydroxy-4,9(11)-19-norpregnadiene-3,20-dione and 17α-hydroxy-1,9(11)-allopregnadiene-3,-20-dione 17-acetate.

The starting compounds thus necessarily possess a $\Delta^{9,11}$-bond and, in the case of 17α-hydroxy-4,9(11)-pregnadiene-3,20-dione (17α-hydroxy-9(11)-dehydroprogesterone), the process of preparing this 9(11)-dehydroprogesterone is described in the literature. The other aforementioned starting 9(11)-dehydro starting compounds are prepared by a combination of processes analogous to those described in the literature. The 17α-acyloxy-9(11)-dehydroprogesterones (i.e. the 17α-acyloxy-4,9(11)-pregnadiene-3,20-diones) are prepared from 17α-hydroxy-9(11)-dehydroprogesterone according to known esterification techniques with a suitable acid such as acetic in the presence of trifluoroacetic anhydride or with a suitable acid anhydride (such as acetic) in the presence of an acidic catalyst such as p-toluenesulfonic acid. When other acids, such as caproic or β-cyclopentylpropionic are used in place of acetic in these esterification procedures, the corresponding 17α-ester is obtained, i.e. the 17α-caproate and 17α-β-cyclopentylpropionate of 17α-hydroxy-4,9(11)-pregnadiene-3,20-dione.

Some 9(11)-dehydro starting compounds are prepared through the 11-hydroxylated progesterones, for example, 17α-methyl-9(11)-dehydroprogesterone (17α-methyl-4,9(11)-pregnadiene-3,20-dione) is prepared from 17α-methyl-11β,21-dihydroxy-4-pregnene-3,20-dione (17α-methyl-corticosterone) by an initial dehydration as effected by reagents such as methanesulfonyl chloride in the presence of pyridine which yields, if methanesulfonyl chloride is the reagent used, 17α-methyl-21-hydroxy-4,9(11)-pregnadiene-3,20-dione 21-methanesulfonate. Conversion of the 21-ester to the 21-desoxy compound is effected by treatment of the ester with, for example, sodium iodide in acetone yielding the corresponding 21-iodo derivative which, upon addition of acetic acid, for example, yields the requisite intermediate, 17α-methyl-9(11)-dehydroprogesterone.

Another 17-substituted-9(11)-dehydro starting compound prepared from a 21-hydroxy intermediate is 17α-hydroxy - 1,9(11)-bisdehydroprogesterone (17α-hydroxy-1,4,9(11)-pregnatriene-3,20-dione). The starting compound 17α,21-dihydroxy-1,9(11)-bisdehydroprogesterone 21-acetate (17α,21-dihydroxy-1,4,9(11)-pregnatriene-3,20-dione 21-acetate) is hydrolyzed to the corresponding 21-ol, 17α,21 - dihydroxy-1,9(11)-bisdehydroprogesterone (17α,21 - dihydroxy - 1,4,9(11)-pregnatriene-3,20-dione). The latter is then treated with a sulfonating agent, such as p-toluenesulfonyl chloride in pyridine (or methanesulfonyl chloride in methylene chloride-pyridine) which yields the corresponding C-21-tosylate (p-toluenesulfonate) or mesylate (methanesulfonate). The tosylate is replaced by iodine by means of sodium iodide in acetone, the 21-iodide upon subsequent reaction with sodium bisulfite solution yielding the 21-desoxy compound 17α-hydroxy-1,9(11) - bisdehydroprogesterone (17α-hydroxy-1,4,9(11)-pregnatriene-3,20-dione).

When an 11-hydroxy intermediate is not available, as in the case of 11β-hydroxy-17α-bromoprogesterone, the hydroxyl group is introduced microbiologically into the 11-desoxy analog, 17α-bromoprogesterone, by means of a microorganism such as *Curvularia lunata* (N.R.R.L. 2380) by procedures analogous to those described in U.S. Patent No. 2,658,023. The 11β-hydroxy-17α-bromoprogesterone thus produced upon treatment with, for example, lithium bromide in glacial acetic acid yields 17α-bromo - 9(11)-dehydroprogesterone (17α-bromo-4,9(11)-pregnadiene-3,20-dione). In like manner, 17α-acetoxy-1-allopregnene-3,20-dione (17α-hydroxy-1-allopregnene-3,20-dione 17-acetate) is 11-hydroxylated by means of *Curvularia lunata* to give 11β,17α-dihydroxy-1-allopregnene-3,20-diode 17-acetate which when dehydrated with an agent such as methanesulfonyl chloride in pyridine yields 17α-acetoxy-1,9(11)-allopregnadiene-3,20-dione.

Our 9(11)-dehydro starting compounds may also be prepared by introducing an 11α-hydroxyl group into an 11-desoxy progesterone through the action of a microorganism such as *Rhizopus nigricans* (A.T.C.C. 6227b) using procedures analogous to those described in U.S. Patent No. 2,602,769. Subsequent treatment of the 11α-hydroxyprogesterone derivative so obtained with a sulfonyl chloride such as methanesulfonyl chloride or toluenesulfonyl chloride yields the corresponding 11α-sulfonate which when treated with a base such as pyridine gives the desired 9(11)-dehydroprogesterone derivative.

The intermediate 17α-chloro-9(11)-dehydroprogesterone is obtained from 3β-hydroxy-5-pregnene-20-one 3-acetate by employing known chemical techniques. Typically, 3β-hydroxy-5-pregnene-20-one 3-acetate when treated wtih acetic anhydride and p-toluenesulfonic acid is enol-acetylated to give 3β,20-dihydroxy-5,17(20)-pregnadiene-3,20-diacetate which, upon chlorination, by a standard procedure such as with chlorine in carbon tetrachloride yields 5α,6β,17α-trichloro-3β-hydroxypregnane-20-one 3-acetate. Dehalogenation of the trichloro intermediate utilizing a reagent such as sodium iodide in acetone gives 17α-chloro-3β-hydroxy-5-pregnene-20-one 3-acetate which is hydrolyzed and oxidized upon treatment with the organism *Flavobacterium dehydrogenans* (Rutgers collection No. 130) in a manner analogous to the procedures outlined in Union of South African Patent No. 3462/55 to give 17α-chloroprogesterone. The double bond between C–9 and C–11 is then introduced into the 17α-chloroprogesterone through the corresponding 11-hydroxy-derivative which is prepared microbiologically, for example, by means of *Rhizopus nigricans* or *Curvularia lunata*. The 11β-hydroxy-17α-chloroprogesterone thus obtained (i.e. *Curvularia lunata* is the microorganism used) is dehydrated by procedures described heretofore to give the necessary intermediate, 17α-hydroxy-9(11)-dehydroprogesterone (17α-hydroxy-4,9(11)-pregnadiene-3,20-dione).

The 1-dehydro intermediates, i.e. 17α-methyl-1,9(11)-bisdehydroprogesterone (17α-methyl-1,4,9(11)-pregnatriene-3,20-dione), 17α-bromo-1,9(11)-bisdehydroprogesterone (17α-bromo-1,4,9(11)-pregnatriene-3,20-dione), 17α-chloro - 1,9(11)-bisdehydroprogesterone (17α-chloro-1,4,9(11) - pregnatriene - 3,30-dione), 17α-hydroxy-1,9(11)-bisdehydroprogesterone (17α - hydroxy-1,4,9(11)-pregnatriene-3,20-dione), and 17α-acyloxy intermediates such as 17α - acetoxy - 1,9(11)-bisdehydroprogesterone (17α-hydroxy - 1,4,9(11)-pregnatriene-3,20-dione 17-acetate are conveniently prepared from the corresponding 17α-substituted-9(11)-dehydroprogesterone by microbiological dehydrogenation with an organism such as, for example, *Corynebacterium simplex* (A.T.C.C. 6946) in a manner similar to that described in U.S. Patent No. 2,837,464, or by chemical oxidation through the use of such reagents as chloranil or selenium dioxide, or by halogenation followed by dehydrohalogenation.

Halogenating agents suitable for use in our process are:

(1) Molecular halogens having a molecular weight greater than 38 and less than 253. This class includes heteroatomic halogen molecules such as iodine monochloride as well as isoatomic halogen molecules such as chlorine and bromine. The molecular halogen employed may be used alone or in admixture with a halide anion. In reactions employing isoatomic molecular halogens, an anion corresponding to the molecular halogen is used. For example, in reactions using molecular chlorine, a suitable chloride salt such as lithium chloride or hydrochloric acid are suitable anion sources. In reactions which employ a heteroatomic molecular halogen, a source of the more electronegative anion is used, i.e. a suitable chloride salt or hydrochloric acid is used in a reaction employing iodine monochloride.

(2) Addition compounds of molecular halogens, said molecular halogens having a molecular weight greater than 38 and less than 253. Examples of such addition compounds are pyridinium bromide perbromide, pyridinium chloride perchloride, dioxane dibromide, iodobenzene dichloride, and the like.

(3) N-haloamides in admixture with a halide anion, the halogen in the halide being at least as electronegative as the halogen cation in the N-haloamide, and the combined molecular weight of said halogens being greater than 38 and less than 253. N-haloamides used in these mixtures are such as N-chlorosuccinimide, N-bromoacetamide, dimethyl-N,N-dibromohydantoin, N-iodosuccinimide and the like. Examples of mixtures of N-haloamide and a halide are such as N-chlorosuccinimide and hydrogen chloride; N-bromoacetamide and hydrogen bromide; N-bromoacetamide and lithium chloride; N-bromoacetamide and hydrogen fluoride; N-iodosuccinimide and sodium chloride. These mixtures may have more than one source of halide ion such as in the reagent combination N-chlorosuccinimide, hydrogen chloride and lithium chloride.

Molecular halogens (both isoatomic and heteroatomic) such as chlorine, bromine and iodine monochloride, and molecular halogen addition compounds such as iodobenzene dichloride or pyridinium bromide perbromide employed in our process may be used directly in their commercially available form, in which case they are added directly to the reaction mixture either alone or in a suitable non-reacting solvent such as acetic acid or tetrahydrofuran. The halogenating agent is preferably used in approximately equivalent quantities to that of the steroid.

Alternatively, the halogenating reactant may be prepared in situ. For example, 0.9–1.2 equivalents of halogen cation (based on the amount of steroid) such as obtained from N-bromosuccinimide is added to a reaction mixture containing a halogen anion of greater or equal electronegativity than the cationic reagent. The halogen anion may be supplied by a hydrohalic acid or by a salt such as sodium bromide, lithium chloride, potassium fluoride, or by mixtures of a hydrohalic acid with an alkali metal halide. Whenever an acid is the source of a halogen anion, approximate theoretical quantities are generally used; whereas if a salt is used as the halogen anion source it may be present in large excess. Such an excess of anion is frequently useful to obtain an increased yield or greater purity of product.

Thus, our novel compounds may be prepared by any one of several methods. For example, 9α,11β-dichloro-17α-hydroxyprogesterone 17-acetate may be prepared from 17α-hydroxy-9(11)-dehydroprogesterone 17-acetate by utilizing such reagents and combinations as (1) chlorine and lithium chloride, (2) N-chlorosuccinimide and lithium chloride, (3) sodium chloride, N-chlorosuccinimide together with hydrogen chloride, (4) chlorine alone, (5) chlorine and hydrogen chloride, and (6) iodobenzene dichloride.

An alternate route for preparing the 17α-acyloxy compounds of our invention is halogenating 17α-hydroxy-9(11)-dehydroprogesterone (or the 1-dehydro analog or 19-nor analog thereof or a 17α-hydroxy-1,9(11)-allopregnadiene-3,20-dione) by any of the above described halogenating methods of our invention, with subsequent esterification of the 9α,11β-dihalogeno-17α-hydroxyprogesterone (or the 1-dehydro or 19-nor analog or the 9α,11β-dihalogeno-17α-hydroxy-1-allopregnene-3,20-dione) thereby obtained. In this manner 17α-hydroxy-9(11)-dehydroprogesterone, upon chlorination with a reagent such as chlorine in carbon tetrachloride in the presence of pyridine, yields 9α,11β-dichloro-17α-hydroxyprogesterone which, when esterified with acetic acid and trifluoroacetic anhydride, for example, gives 9α,11β-dichloro-17α-hydroxyprogesterone 17-acetate. Other acids may be substituted for acetic acid in the esterification step to obtain the corresponding 17α-acyloxy dihalogenated progesterone.

Our novel halogenating process is also useful in preparing the 1,4-pregnadienes of our invention. Thus, a 17-substituted-9α,11β-dihalogeno-1-dehydroprogesterone such as, for example, 9α,11β-dichloro-17α-methyl-1-dehydroprogesterone is prepared from 17α-methyl-1,9(11)-bisdehydroprogesterone by utilizing any one of the six reagents and combinations listed previously. In addition, our novel halogenated 1-dehydroprogesterones are obtained from the corresponding halogenated progesterones by microbiological or chemical dehydrogenation techniques as heretofore described. Thus, 9α,11β-dichloro-17α-methyl-progesterone is converted to 9α,11β-dichloro-17α-methyl-1-dehydroprogesterone by the action of a culture of the microorganism *Corynebacterium simplex*.

Our process, whereby a 17-substituted-9(11)-dehydroprogesterone is converted to a 17-substituted-9α,11β-dihalogeno derivative is generally carried out in the presence of a non-reacting solvent at temperatures ranging from 5° C. to 50° C. with reaction times varying from one-half to 24 hours, depending on the reagents involved. It is preferred that the halogen cation source be present in amounts of 0.9–1.2 equivalents based upon the amount of steroid. The choice of solvent in each reaction is naturally determined by the solubility of the reactants in the process. A preferred reaction condition employs glacial acetic acid as the sole or major solvent with the reaction being carried out at room temperature for a period of approximately two hours.

Although glacial acetic acid is frequently the preferred solvent, other solvents are used in our dihalogenation process either alone or in combination with acetic acid. Other solvents which may be employed include lower aliphatic acids such as propionic and diethylacetic, halogenated hydrocarbons such as methylene chloride and chloroform, saturated ethers such as tetrahydrofuran and dioxane, and inert solvents such as dimethylsulfoxide, as well as suitable mixtures of these solvents.

Further, when carrying out the above-described process in a halogenated hydrocarbon solvent such as methylene chloride, chloroform or carbon teterachloride, the yield and purity of the dihalogenated progesterone obtained is greatly increased by adding pyridine to the reaction mixture. Preferably from one to five equivalents of pyridine is added, based on the amount of steroid being converted. Other organic basic agents which may also be used in conjunction with a halogenated hydrocarbon solvent are aromatic tertiary amines such as lutidine, collidine, alkyl substituted pyridines, and the like. The reaction is usually carried out intitially at —20° C. with subsequent warning to about room temperature. The reaction time may be as short as five minutes or as long as several hours. In general the optimum reaction time is about one hour.

Our process whereby a 17-substituted-9(11)-dehydroprogesterone is converted to a 17-substituted-9α,11β-dihalogeno progesterone is also applicable, as mentioned previously, to 17-substituted-9(11)-dehydro-19-norprogesterones. With the aforementioned 9(11)-dehydro-19-norprogesterones there are produced the novel progestational agents, 9α-X-11β-Y-17α-R-19-norprogesterones wherein X, Y, and R are as heretofore described. Thus, 17α-methyl-9(11)-dehydro-19-norprogesterone (17α-methyl-19-nor-4,9(11)-pregnadiene-3,20-dione), 17α-bromo-9(11)-dehydro-19-norprogesterone (17α-bromo-19-nor-4,9(11)-pregnadiene-3,20-dione), 17α-chloro-9(11)-dehydro-19-norprogesterone (17α-chloro-19-nor-4,9(11)-pregnadiene-3,20-dione), 17α-hydroxy-9(11)-dehydro-19-norprogesterone (17α-hydroxy-19-nor-4,9(11)-pregnadiene-3,20-dione) and 17α-acyloxy-9(11)-dehydro-19-norprogesterones (17α-acyloxy-19-nor-4,9(11)-pregnadiene-3,20-diones), when reacted with chlorine in carbon tetrachloride in the presence of pyridine, for example, are converted to their respective 9α-11β-dichloro derivatives.

When preparing a 9α,11β-dihalogenated 17α-acyloxy-19-norprogesterone by our process the halogenation step is preferably performed on the corresponding 17α-hydroxy-9(11)-dehydro intermediates prior to esterification of the 17-hydroxy group. Thus, 17α-hydroxy-9(11)-dehydroprogesterone is first converted to a 9α,11β-dihalogenated-17α-hydroxy-19-norprogesterone which is then esterified by methods heretofore described to give the 9(11)-dihalogenated-17α-acyloxyprogesterone.

Our novel dihalogenated 17-substituted progesterones, their 1-dehydro and 19-nor analogs, as well as the dihalogenated 17-substituted-1-allopregnenes of our invention (except those having a hydroxy group at C–17) are very active progestational agents being specific in their action, and devoid of androgenic, estrogenic or corticoid activity. That our compounds have progestational activity at all is surprising in view of the well known fact that substitution in ring-C of progesterone and its derivatives such as, for example, 11-hydroxyprogesterone and the 11-acyloxy derivatives thereof eliminates progestational activity or reduces it to such an extent that the compounds are useless for therapeutic purposes. Our ring-C halogenated-17-substituted progesterones, on the other hand, are significantly more active than progesterone by the intramuscular route. Moreover, orally our compounds are several times as active as ethisterone, the known standard progestational agent.

In addition to being active both orally and intramuscularly, our halogenated progestins possess the added advantage of having a minimum effect on water, sodium and potassium metabolism. Thus, they may be administered without causing the usual side effects associated with electrolyte imbalance.

Our therapeutically active compounds are useful for the treatment of conditions requiring progestational agents such as the maintenance of pregnancy, or treatment of functional dysmenorrhea, premenstrual tension, habitual or threatened abortion. When administered orally, our compounds are preferably used in the form of tablets containing from 1 to 10 mg. together with the excipients such as starch or milk sugar. For subcutaneous and intramuscular administration, solutions or suspensions of our compounds with a non-toxic liquid vehicle are used. The dosage required may vary with the indications being treated and may range from about 5 to 25 mg. daily.

Our halogenated progestins are also valuable in the veterinary field for treating conditions in both large and small animals which require a progestational agent. In breeding animals, for example, our compounds are useful in preventing threatened abortion. Additional uses are in controlling egg and milk production by regulating the cycle of chickens and cows by the administration of our progestational agents.

The 17α-hydroxy compounds of our invention, i.e. the 17α-hydroxy - 9α,11β - dihalogenoprogesterones, the 17α-hydroxy-9α,11β-dihalogeno-1 - dehydroprogesterones, the 17α-hydroxy-9α,11β-dihalogeno-19-norprogesterone, and the 17α-hydroxy-9α,11β-dihalogeno-1-allopregnene-3,20-diones, are valuable mainly as intermediates in the preparation of the corresponding 17α-acyloxy compounds, which are active progestational egents.

The following examples are illustrative of the procedures employed in preparing the compounds of this invention, but are not to be construed as limiting the scope thereof; the scope of our invention being limited only by the appended claims.

This application is a continuation-in-part of our copending application, Serial No. 113,089, filed May 29, 1961.

EXAMPLE 1

17α-Hydroxy-4,9(11)-Pregnadiene-3,20-Dione 17-Acetate

To a solution of 5.0 g. of 17α-hydroxy-4,9(11)-pregnadiene-3,20-dione in 50 ml. of acetic acid there is added 10 ml. of trifluoroacetic anhydride. The solution is heated on the steam bath for 45 minutes, then is poured into ice-water. A solid separates which is filtered and crystallized from acetone-ether to give 17α-hydroxy-4,9(11)-pregnadiene-3,20-dione 17-acetate, M.P. 238–241° C., [α]$_D$+50° (chloroform);

$\lambda^{MeOH}_{max.}$ 239 m$\mu$ $\epsilon$=17,000.

*Analysis.*—Calcd. for $C_{23}H_{30}O_4$: C, 74.56; H, 8.16. Found: C, 74.64; H, 8.07.

EXAMPLE 2

17α-Hydroxy-4,9(11)-Pregnadiene-3,20-Dione 17-Caproate

A mixture of 1.0 g. of 17α-hydroxy-4,9(11)-pregnadiene-3,20-dione and 5 ml. of caproic acid is heated at 80° C., in the presence of 1.0 ml. of trifluoroacetic anhydride, for 45 minutes. The mixture is poured into ice-water and the excess acid neutralized with sodium carbonate. The crude reaction mixture is extracted with methylene chloride. The organic extracts are combined and concentrated to a residue which is chromatographed on Florisil. The material eluted with 10–25% ether in hexane is combined and crystallized from pentane to yield 17α-hydroxy-4,9(11)-pregnadiene-3,20-dione 17-caproate, M.P. 126–128° C.

$\lambda^{MeOH}_{max.}$ 239 m$\mu$ ($\epsilon$=16,800), [α]$_D$+42° (chloroform).

*Analysis.*—Calcd. for $C_{27}H_{38}O_4$: C, 76.02; H, 8.98. Found: C, 76.11; H, 8.94.

EXAMPLE 3

17α-Hydroxy-4,9(11)-Pregnadiene-3,20-Dione 17-(β-Cyclopentylpropionate)

To a solution of 500 mg. of 17α-hydroxy-4,9(11)-pregnadiene-3,20-dione in 10 ml. of β-cyclopentylpropionic acid and 2.5 ml. of β-cyclopentylpropionic anhydride in a vessel flushed with nitrogen, there is added 200 mg. of p-toluenesulfonic acid with stirring at a temperature of about 20° C. The reaction mixture is allowed to stand for 4 hours, then poured into ice-water. Excess acid is neutralized with sodium carbonate, and the crude mixture is extracted with ether. The ether extracts are combined, washed with water, dried over magnesium sulfate, filtered, and concentrated to a residue. The residue is crystallized from methanol to give 17α-hydroxy-4,9(11)-pregnadiene-3,20-dione 17-(β-cyclopentylpropionate)

$\lambda^{MeOH}_{max.}$ 239 m$\mu$

EXAMPLE 4

9α,11β-Dichloro-17α-Hydroxyprogesterone 17-Acetate

A solution of 1 g. of 17α-hydroxy-4,9(11)-pregnadiene-3,20-dione 17-acetate (the compound of Example 1) and 4 g. of lithium chloride in 40 ml. of glacial acetic acid is cooled to about 10° C. and there is added 250 mg. of hydrogen chloride in 1 ml. of tetrahydrofuran followed by 395 mg. of 96% N-chlorosuccinimide. The solution is stirred at room temperature for 20 minutes in the absence of light, then is poured into ice-water with stirring. A precipitate forms which is filtered, washed with water, triturated with ether and crystallized twice from acetone-hexane to give 9α,11β-dichloro-17α-hydroxyprogesterone 17-acetate, M.P. 224–233° C. dec., [α]$_D$+129° (chloroform)

$\lambda^{MeOH}_{max.}$ 238 m$\mu$ $\epsilon$=17,000.

*Analysis.*—Calcd. for $C_{23}H_{30}O_4Cl_2$: C, 62.58; H, 6.85; Cl. 16.06. Found: C. 62.63; H, 7.03; Cl, 15.90.

Alternatively, the compound of this example is prepared by adding a solution of 200 mg. of chlorine in 30 ml. of acetic acid to a mixture of 1 g. of 17α-hydroxy-4,9(11)-pregnadiene-3,20-dione 17-acetate and 4 g. of lithium chloride in 20 ml. of glacial acetic acid. The mixture is stirred at room temperature for 3 hours, then poured into ice-water with stirring. A solid product precipitates which is filtered, washed with water, triturated with ether, and crystallized from acetone-hexane to give 9α,11β-dichloro-17α-hydroxyprogesterone 17-acetate.

A second alternative for the preparation of the compound of this example is by reacting 1 g. of 17α-hydroxy-4,9(11)-pregnadiene-3,20-dione 17-acetate dissolved in 30 ml. of carbon tetrachloride with 1.8 ml. of chlorine in carbon tetrachloride (111 mg./ml.) in the presence of 0.65 ml. of pyridine at —20° C. The mixture is stirred at —20° C. for 15 minutes, then is allowed to warm to room temperature over a period of one-half hour. The solution is filtered and the filtrate concentrated in vacuo to an oily residue. Trituration of this residue with ether yields solid material which is crystallized from acetone-hexane to give 9α,11β-dichloro-17α-hydroxyprogesterone 17-acetate.

EXAMPLE 5

9α-Bromo-11β-Chloro-17α-Hydroxyprogesterone 17-Acetate

One gram of 17α-hydroxy-4,9(11)-pregnadiene-3,20-dione 17-acetate (the compound of Example 1) and 4 g. of lithium chloride is dissolved in 50 ml. of glacial acetic acid and there is added 420 mg. of N-bromoacetamide. The mixture is stirred at room temperature and a slow stream of gaseous hydrogen chloride is passed over the surface until the solution begins to darken (10–30 seconds). The hydrogen chloride gas is removed and the solution is stirred in the dark at room temperature for about 10 minutes. The solution is poured into ice-water with stirring and the resultant solid is filtered, washed with water, and crystallized from acetone-hexane to give 9α-bromo-11β-chloro-17α-hydroxyprogesterone 17 - acetate, M.P. 124–129° C. dec., [α]_D —142° (chloroform)

$$\lambda_{max.}^{MeOH}\ 242\ m\mu$$

ε=15,600.

Analysis.—Calcd. for $C_{23}H_{30}O_4BrCl$: C, 56.85; H, 6.22; Br, 16.45; Cl, 7.30. Found: C, 56.83; H, 6.28; Br, 16.07; Cl, 7.35.

EXAMPLE 6

9α-Bromo-11β-Fluoro-17α-Hydroxyprogesterone 17-Acetate

To a solution of 1 g. of 17α-hydroxy-4,9(11)-pregnadiene-3,20-dione 17-acetate (the compound of Example 1) and 425 mg. of N-bromoacetamide in 50 ml. of diethylacetic acid there is added a solution of 500 mg. of hydrogen fluoride in 4.7 ml. of chloroform-tetrahydrofuran. The solution is stirred at room temperature for 2 hours, then poured into ice-water with stirring. The acid is neutralized by addition of sodium bicarbonate and a resinous precipitate forms from which the aqueous solution is decanted. The precipitate is then dissolved in methylene chloride and the solution is washed with 5% aqueous sodium hydroxide, then with water, is dried over magnesium sulfate, filtered and concentrated in vacuo. The resultant residue is triturated with pentane, filtered and crystallized from methylene chloride-pentane to give 9α-bromo-11β-fluoro-17α-hydroxyprogesterone 17-acetate, M.P. 176–180° C. dec., $$\lambda_{max.}^{MeOH}\ 240\ m\mu$$

ε=16,100 [α]_D+81° (chloroform).

Analysis.—Calcd. for $C_{23}H_{30}O_4BrF$: Br, 17.03; F, 4.05. Found: Br, 17.56; F, 3.85.

EXAMPLE 7

9α,11β-Dichloro-17α-Hydroxyprogesterone 17-Caproate

17α-hydroxy-4,9(11)-pregnadiene-3,20-dione 17-caproate (the compound of Example 2) is reacted with 165 mg. of N-chlorosuccinimide, hydrogen chloride and lithium chloride in the manner described in Example 4. The resultant product is isolated and purified in the described manner to give 9α,11β-dichloro-17α-hydroxyprogesterone 17-caproate, $$\lambda_{max.}^{MeOH}\ 238\ m\mu$$

EXAMPLE 8

9α,11β-Dichloro-17α-Hydroxyprogesterone 17-(β-Cyclopentylpropionate)

17α-hydroxy-4,9(11)-pregnadiene - 3,20 - dione 17-(β-cyclopentylpropionate), the compound of Example 3, is reacted with chlorine and lithium chloride in the manner of Example 4 and the resultant product isolated and purified to give 9α,11β-dichloro-17α-hydroxyprogesterone 17-(β-cyclopentylpropionate), $$\lambda_{max.}^{MeOH}\ 238\ m\mu$$

EXAMPLE 9

9α,11β-Dibromo-17α-Hydroxyprogesterone 17-Acetate

To a solution of 1 g. of 17α-hydroxy-4,9(11)-pregnadiene-3,20-dione 17-acetate (the compound of Example 1) and 4 g. of lithium bromide in 50 ml. of acetic acid there is added 400 mg. of N-bromoacetamide followed by a solution of 220 mg. of hydrogen bromide in 4.3 ml. of acetic acid. The mixture is stirred at room temperature for one hour, then is poured into ice-water. A solid forms which is filtered, washed with water, then crystallized and recrystallized twice from acetone-hexane to give 9α,11β-dibromo-17α-hydroxyprogesterone 17-acetate, $$\lambda_{max.}^{MeOH}\ 241\ m\mu$$

EXAMPLE 10

9α-Iodo-11β-Chloro-17α-Hydroxyprogesterone 17-Acetate

To a solution of 1 g. of 17α-hydroxy-4,9(11)-pregnadiene-3,20-dione 17-acetate (the compound of Example 1) in 40 ml. of tetrahydrofuran which is chilled to 0° C. there is added 3 drops of perchloric acid and 3 g. of lithium chloride followed by the dropwise addition of a solution of 470 mg. of iodine monochloride in 5 ml. of tetrahydrofuran. The reaction mixture is stirred at room temperature of 5 hours, then poured into ice water. A gummy precipitate forms which is dissolved in methylene chloride, the solution is warmed, decolorizing carbon added, then filtered. Pentane is added to the clarified methylene chloride solution and a precipitate is formed which is filtered and crystallized from acetone-hexane to give 9α-iodo-11β-chloro-17α-hydroxyprogesterone 17-acetate.

EXAMPLE 11

9α-Chloro-11β-Fluoro-17-Hydroxyprogesterone 17-Acetate

To a solution of 500 mg. of 17α-hydroxy-4,9(11)-pregnadiene-3,20-dione 17-acetate (the compound of Example 1) in 25 ml. of diethylacetic acid there is added 195 mg. of N-chlorosuccinimide followed by a solution of 620 mg. of hydrogen fluoride in 3.2 ml. of a mixture of tetrahydrofuran and chloroform. The reaction mixture is stirred at room temperature for 48 hours, then is poured into an aqueous sodium carbonate solution. The mixture is extracted with methylene chloride. The organic extracts are combined and evaporated to a residue which is chromatographed on silica gel. The product eluted with 20% ether in hexane is crystallized with acetone-hexane to give 9α-chloro-11β-fluoro-17-hydroxyprogesterone 17-acetate, $$\lambda_{max.}^{MeOH}\ 238\ m\mu$$

EXAMPLE 12

9α-Iodo-11β-Fluoro-17-Hydroxyprogesterone 17-Acetate

To a solution of 500 mg. of 17α-hydroxy-4,9(11)-pregnadiene-3,20-dione 17-acetate (the compound of Example 1) and 3 g. of potassium fluoride in 40 ml. of dimethylsulfoxide there is added 320 mg. of N-iodosuccinimide. The reaction mixture is stirred at room temperature for 16 hours, poured into ice-water and extracted with methylene chloride. The combined organic extracts are warmed, decolorizing carbon added, then filtered, and the filtrate concentrated in vacuo. The resultant residue is chromatographed on silica gel. The fraction eluted with 50% ether-hexane yields 9α-iodo-11β-fluoro-17-hydroxyprogesterone 17-acetate.

EXAMPLE 13

17α-Hydroxy-1,4,9(11)-Pregnatriene-3,20-Dione (A) 17α,21-DIHYDROXY-1,4,9(11)-PREGNATRIENE-3,20-DIONE A solution of 2 g. of 17α,21-dihydroxy-1,4,9(11)-pregnatriene-3,20-dione 21-acetate in 100 ml. of a 3:1 methanol chloroform mixture is chilled in ice to which there is added dropwise 52 ml. of 0.1 N sodium hydroxide solution (one equivalent). The reaction mixture is stirred at 0° C. for 10 minutes, then diluted with water and extracted with methylene chloride. Evaporation of the solvent and crystallization of the residue from acetone-hexane affords 17α,21-dihydroxy-1,4,9(11)-pregnatriene-3,20-dione, M.P. 220–228 C. (dec.);

$\lambda_{max.}^{MeOH}$ 238 mμ

ε=15,500.

*Analysis.*—Calcd. for $C_{21}H_{26}O_4$: C, 73.66; H, 7.66. Found: C, 73.58; H, 7.54.

(B) 17α-HYDROXY-1,4,9(11)-PREGNATRIENE 3,20-DIONE

A solution of 10 g. of 17α,21-dihydroxy-1,4,9(11)-pregnatriene-3,20-dione (the compound of Example 13A) in 100 ml. of dry pyridine is chilled in a Dry Ice-acetone bath and there is added a solution of 6 g. of p-toluenesulfonyl chloride in 50 ml. of methylene chloride. The mixture is stirred in the cold bath for 2 hours and then kept at −20° C. for 24 hours. At the end of this time, the reaction mixture is diluted with methylene chloride and the solution washed first with water, then with 10% sulfuric acid, 10% sodium bicarbonate, very dilute hydrochloric acid and finally with water. The solution is dried over a magnesium sulfate, filtered and concentrated to a residue which is dissolved in acetone. The acetone solution is warmed on the steam bath, decolorizing carbon added, and the solution filtered. To the clarified soluiton there is added a warm solution of 10 g. of sodium iodide in acetone. After heating this mixture on the steam bath for five minutes, three ml. of acetic acid is added, and the mixture is warmed briefly, and then aqueous sodium bisulfite. The resulting pale yellow solution is poured into water and the resulting precipitate is filtered and washed with water, and crystallized from acetone-ether to give 17α-hydroxy-1,4,9(11)-pregnatriene-3,20-dione, M.P. 233–235° C.

$\lambda_{max.}^{MeOH}$ 238 mμ, ε=15,600

$[\alpha]_D$ −19° (chloroform).

EXAMPLE 14

*17α-Hydroxy-1,4,9(11)-Pregnatriene-3,20-Dione 17-Acetate*

A solution of 5 g. of 17α-hydroxy-1,4,9(11)-pregnatriene-3,20-dione (the compound of Example 13) is dissolved in 50 ml. of glacial acetic acid and 10 ml. of trifluoroacetic anhydride. The solution is left at room temperature for 24 hours, then poured into ice-water. A solid separates which is filtered, washed with water, and crystallized from acetone-hexane to give 17α-hydroxy-1,4,9(11)-pregnatriene-3,20-dione 17-acetate, $\lambda_{max.}^{MeOH}$ 238 mμ

EXAMPLE 15

*9α,11β-Dichloro-17α-Hydroxy-1,4-Pregnadiene-3,20-Dione 17-Acetate*

One gram of 17α-hydroxy-1,4,9(11)-pregnatriene-3,20-dione 17-acetate (the compound of Example 14) is reacted with 395 mg. of N-chlorosuccinimide in the presence of hydrogen chloride and lithium chloride in the manner of Example 4 to give 9α,11β-dichloro-17α-hydroxy-1,4-pregnadiene-3,20-dione 17-acetate, $\lambda_{max.}^{MeOH}$ 237 mμ

ε=15,300, M.P. 230–235° C. dec. $[\alpha]_D$+115° (chloroform).

*Analysis.*—Calcd. for $C_{23}H_{28}O_4Cl_2$: C, 62.87; H, 6.42; Cl, 16.14. Found: C, 62.26; H, 6.73; Cl, 15.85.

Alternatively, the compound of this example is prepared by the microbiological oxidation of 9α,11β-dichloro-17α-hydroxyprogesterone 17-acetate (the compound of Example 4) in the following manner.

A one hundred ml. broth culture containing a 0.1% yeast extract concentration, 9.0 ml. of 0.2 M $KH_2PO_4$ and 9.0 ml. of 0.2 M $Na_2HPO_4$, contained in a 300 ml. Erlenmeyer flask, is seeded with 1 ml. of a 24-hour broth culture of *Corynebacterium simplex* (A.T.C.C. 6946). The flask is incubated at 28° C. for 24 hours. A second 300 ml. Erlenmeyer flask containing 150 mg. of sterile 17α - hydroxy - 1,4,9(11) - pregnatriene - 3,20-dione 17-acetate in 5.0 ml. acetone is inoculated with the 24-hour culture of *Corynebacterium simplex* (A.T.C.C. 6946). The culture-containing steroid solution is incubated for 48 hours at 28–30° C.

After termination of the transformation period, the pH is 7.2–7.3. The culture is now directly extracted with 3 equal volumes of $CHCl_3$, the solvent volumes combined and concentrated on a steam bath to a residue which is crystallized from acetone-hexane to give 9α,11β-dichloro-17α-hydroxy-1,4-pregnadiene-3,20-dione 17-acetate.

A second alternative method for the preparation of the compound of this example is as follows.

17α-hydroxy-1,4,9(11)-pregnatriene - 3,20 - dione (the compound of Example 13B) is reacted with 220 mg. of chlorine gas in carbon tetrachloride in the presence of pyridine in the manner of the alternative procedure of Example 4 to give 9α,11β-dichloro-17α-hydroxy-1,4-pregnadiene-3,20-dione, M.P. 235–239° C. dec.

$\lambda_{max.}^{MeOH}$ 238 mμ

ε=15,000 $[\alpha]_D$+129° (chloroform).

*Analysis.*—Calcd. for $C_{21}H_{28}O_3Cl_2$: C, 63.48; H, 6.60; Cl, 17.85. Found: C, 63.13; H, 6.57; Cl, 17.86.

The 17-hydroxy group is then esterified in the manner described in Example 14 by means of trifluoroacetic anhydride and acetic acid to give 9α,11β-dichloro-17α-hydroxy-1,4-pregnadiene-3,20-dione 17-acetate.

EXAMPLE 16

*9α-Iodo-11β-Chloro-17α-Hydroxy-1,4-Pregnadiene-3,20-Dione 17-Acetate*

To a solution of 1.0 g. of 17α-hydroxy-1,4,9(11)-pregnatriene-3,20-dione 17-acetate (the compound of Example 14) in 40 ml. of tetrahydrofuran is chilled to 0° C., there is added 3 drops of perchloric acid and 3. g. of lithium chloride, followed by dropwise addition of a solution of 470 mg. of iodine monochloride in 5 ml. of tetrahydrofuran. The reaction mixture is stirred at room temperature for 5 hours, then poured into ice-water. A gummy precipitates forms which is dissolved in methylene chloride. The solution is warmed, decolorizing carbon added, then filtered. Pentane is added to the clarified methylene chloride solution and a solid forms which is filtered and crystallized from acetone-hexane to give 9α-iodo-11β-chloro-17α-hydroxy-1,4-pregnadiene-3,20-dione 17-acetate.

Alternatively, 9α-iodo-11β-chloro-17α-hydroxyprogesterone 17-acetate (the compound of Example 10) is subjected to the action of a culture of *Corynebacterium simplex* in the manner described in the alternative procedure of Example 15 to give 9α-iodo-11β-chloro-17α-hydroxy-1,4-pregnadiene-3,20-dione 17-acetate.

EXAMPLE 17

*9α-Chloro-11β-Fluoro-17α-Hydroxy-1,4-Pregnadiene-3,20-Dione 17-Acetate*

17α - hydroxy - 1,4,9(11) - pregnatriene - 3,20 - dione 17-acetate (the compound of Example 14) is reacted with N-chlorosuccinimide and hydrogen fluoride, and the resultant product isolated and purified in the manner described in Example 11 to give 9α-chloro-11β-fluoro-17α-hydroxy-1,4-pregnadiene-3,20-dione 17-acetate.

Alternatively, 9α-chloro-11β-fluoro-17α-hydroxyprogesterone 17-acetate (the compound of Example 11) is subjected to the action of a culture of *Corynebacterium simplex* in the manner described in the alternative procedure of Example 15 to give 9α-chloro-11β-fluoro-17α-hydroxy-1,4-pregnadiene-3,20-dione 17-acetate.

EXAMPLE 18

9α-Bromo-11β-Chloro-17α-Hydroxy-1,4-Pregnadiene-3,20-Dione 17-Acetate

17α-hydroxy-1,4,9(11)-pregnatriene-3,20-dione 17-acetate (the compound of Example 14) is reacted with N-bromoacetamide, lithium chloride and gaseous hydrogen chloride in acetic acid in the manner described in Example 5 to give 9α-bromo-11β-chloro-17α-hydroxy-1,4-pregnadiene-3,20-dione 17-acetate.

Alternatively, 9α-bromo-11β-chloro-17α-hydroxyprogesterone 17-acetate (the compound of Example 5) is subjected to the action of a culture of *Corynebacterium simplex* in the manner described in the alternative procedure of Example 15 to give 9α-bromo-11β-chloro-17α-hydroxy-1,4-pregnadiene-3,20-dione 17-acetate.

EXAMPLE 19

9α-Bromo-11β-Fluoro-17α-Hydroxy-1,4-Pregnadiene-3,20-Dione 17-Acetate

17α-hydroxy-1,4,9(11)-pregnatriene-3,20-dione 17-acetate (the compound of Example 14) is reacted with N-bromoacetamide in the presence of hydrogen fluoride and the resultant product isolated and purified in the manner described in Example 6 to give 9α-bromo-11β-fluoro-17α-hydroxy-1,4-pregnadiene-3,20-dione 17-acetate.

Alternatively, 9α-bromo-11β-fluoro-17α-hydroxyprogesterone 17-acetate (the compound of Example 6) is subjected to the action of a culture of *Corynebacterium simplex* in the manner described in the alternative procedure of Example 15 to give 9α-bromo-11β-fluoro-17α-hydroxy-1,4-pregnadiene-3,20-dione 17-acetate.

A second alternative procedure is as follows.

17α-hydroxy-1,4,9(11)-pregnatriene-3,20-dione (500 mg.), the compound of Example 13, is reacted with 210 mg. of N-bromoacetamide in the presence of hydrogen fluoride in diethylacetic acid in the manner of Example 6. The product is isolated and purified in the described manner to give 9α-bromo-11β-fluoro-17α-hydroxyprogesterone, which is then esterified with acetic acid in the presence of trifluoroacetic acid in the manner described in Example 14 to give 9α-bromo-11β-fluoro-17α-hydroxy-1,4-pregnadiene-3,20-dione 17-acetate.

EXAMPLE 20

9α,11β-Dibromo-17α-Hydroxy-1,4-Pregnadiene-3,20-Dione 17-Acetate

17α-hydroxy-1,4,9(11)-pregnatriene-3,20-dione 17-acetate (the compound of Example 14) is reacted with N-bromoacetamide, lithium bromide and hydrogen bromide in acetic acid and the resultant product isolated and purified in the manner described in Example 9 to give 9α,11β-dibromo-17α-hydroxy-1,4-pregnadiene-3,20-dione 17-acetate.

Alternatively, 9α,11β-dibromo-17α-hydroxyprogesterone 17-acetate (the compound of Example 9) is subjected to the action of a culture of *Corynebacterium simplex* in the manner described in the alternative procedure of Example 15 to give 9α,11β-dibromo-17α-hydroxy-1,4-pregnadiene-3,20-dione 17-acetate.

EXAMPLE 21

17α-Hydroxy-1,4,9(11)-Pregnatriene-3,20-Dione 17-Caproate

17α-hydroxy-1,4,9(11)-pregnatriene-3,20-dione (the compound of Example 13) is reacted with caproic acid in the presence of trifluoroacetic anhydride and the resultant product isolated and purified in the manner described in Example 14 to give 17α-hydroxy-1,4,9(11)-pregnatriene-3,20-dione 17-caproate.

Alternatively, 17α-hydroxy-4,9(11)-pregnadiene-3,20-dione 17-caproate (the compound of Example 2) is subjected to the action of a culture of *Corynebacterium simplex* in the manner described in the alternative procedure of Example 15 to give 17α-hydroxy-1,4,9(11)-pregnatriene-3,20-dione 17-caproate.

EXAMPLE 22

17α-Hydroxy-1,4,9(11)-Pregnatriene-3,20-Dione 17-(β-Cyclopentylpropionate)

17α-hydroxy-1,4,9(11)-pregnatriene-3,20-dione (the compound of Example 13) is reacted with β-cyclopentylpropionic acid and β-cyclopentylpropionic anhydride and the resultant product is isolated and purified in the manner described in Example 3 to give 17α-hydroxy-1,4,9(11)-pregnatriene-3,20-dione 17-(β-cyclopentylpropionate).

Alternatively, 17α-hydroxy-4,9(11)-pregnadiene-3,20-dione 17-(β-cyclopentylpropionate), the compound of Example 3, is subjected to the action of a culture of *Corynebacterium simplex* in the manner described in the alternative procedure of Example 15 to give 17α-hydroxy-1,4,9(11)-pregnatriene-3,20-dione 17-(β-cyclopentylpropionate).

EXAMPLE 23

9α,11β-Dichloro-17α-Hydroxy-1,4-Pregnadiene-3,20-Dione 17-(β-Cyclopentylpropionate)

17α-hydroxy-1,4,9(11)-pregnatriene-3,20-dione 17-(β-cyclopentylpropionate), the compound of Example 22, is reacted with N-chlorosuccinimide in the presence of hydrogen chloride and lithium chloride in the manner described in Example 15 to give 9α,11β-dichloro-17α-hydroxy-1,4-pregnadiene-3,20-dione 17-(β-cyclopentylpropionate).

Alternatively, 9α,11β-dichloro-17α-hydroxy-4,9(11)-pregnadiene-3,20-dione 17-(β-cyclopentylpropionate), the compound of Example 8, is subjected to the action of a culture of *Corynebacterium simplex* in the manner described in the alternative procedure of Example 15 to give 9α,11β-dichloro-17α-hydroxy-1,4-pregnadiene-3,20-dione 17-(β-cyclopentylpropionate).

EXAMPLE 24

9α,11β-Dichloro-17α-Hydroxy-1,4-Pregnadiene-3,20-Dione 17-Caproate

17α-hydroxy-1,4,9(11)-pregnatriene-3,20-dione 17-caproate (the compound of Example 21) is reacted with N-chlorosuccinimide in the presence of hydrogen chloride and lithium chloride in the manner of Example 15 to give 9α,11β-dichloro-17α-hydroxy-1,4-pregnadiene-3,20-dione 17-caproate.

Alternatively, 9α,11β-dichloro-17α-hydroxy-4-pregnene-3,20-dione 17-caproate (the compound of Example 7) is subjected to the action of a culture of *Corynebacterium simplex* in the manner described in the alternative procedure of Example 15 to give 9α,11β-dichloro-17α-hydroxy-1,4-pregnadiene-3,20-dione 17-caproate.

EXAMPLE 25

9α-Iodo-11β-Bromo-17α-Hydroxyprogesterone 17-Acetate

To a solution of 1 g. of 17α-hydroxy-4,9(11)-pregnadiene-3,20-dione 17-acetate (prepared as described in Example 1), and 4 g. of lithium bromide in 50 ml. of acetic acid, there is added 620 mg. of N-iodosuccinimide followed by a solution of 220 mg. of hydrogen bromide in 4.5 ml. of acetic acid. The mixture is stirred at room temperature for one hour, then is poured into ice-water. A solid forms which is filtered, and then chromatographed on silica gel. The substance eluted with 30% ether in hexane is crystallized from acetone-hexane to give 9α-iodo-11β-bromo-17α-hydroxyprogesterone 17-acetate.

EXAMPLE 26

17α-Hydroxy-19-Nor-4,9(11)-Pregnadiene-3,20-Dione (A) 11β,17α-DIHYDROXY-19-NORPROGESTERONE A living culture of the organism *Curvularia lunata*

(N.R.R.L. 2380) is rinsed from an agar slant under sterile conditions into a sterile medium having the following composition:

|  | Percent |
|---|---|
| Malt extract | 5 |
| Sucrose | 1 |
| Sodium nitrate | 0.2 |
| Potassium chloride | 0.05 |
| Magnesium sulfate heptahydrate | 0.05 |
| Ferrous sulfate heptahydrate | 0.05 |
| Dipotassium acid phosphate | 0.1 |

Distilled water, to adjust to pH 7.0 with potassium hydroxide.

100 ml. of this medium is placed in each of several 300 ml. flasks. To each flask is added 50 mg. of 17α-hydroxy-19-nor-progesterone dissolved in a small volume of acetone. The mixture is shaken for a period of 7 days at a room temperature of about 28° C. The contents of the flasks are then combined and extracted with several portions of ethylene dichloride using one-fifth the volume of the aqueous phase each time. The combined organic extracts are dried over sodium sulfate, filtered and concentrated in vacuo to a residue having a volume of 1–2 ml.

The ethylene dichloride residue is then placed on a chromatographic column consisting of silica gel, mixed with a small volume of methylene chloride. The column is developed with methylene chloride and the eluates are combined and concentrated in vacuo to a residue which is crystallized from acetone-hexane to give 11β,17α-dihydroxy-19-nor-progesterone.

(B) 17α-HYDROXY-19-NOR-4,9(11)-PREGNADIENE-3,20-DIONE

Two grams of 11β,17α-dihydroxy-19-norprogesterone, prepared as described in Example 26A, in 50 ml. of pyridine is chilled to 0° C., and there is added 5 ml. of methanesulfonyl chloride dissolved in 10 ml. of pyridine. The mixture is allowed to stand in the ice-box for 96 hours. A small amount of ice is added to the reaction mixture, and the solution is diluted with chloroform, washed with water, then with 5% hydrochloric acid, 5% sodium bicarbonate and finally again with water. The solution is dried over sodium sulfate, filtered, and concentrated in vacuo to a residue which is crystallized from methylene chloride-hexane to give 17α-hydroxy-19-nor-4,9(11)-pregnadiene-3,20-dione.

EXAMPLE 27

9α,11β-Dichloro-17α-Hydroxy-19-Norprogesterone 17-Acetate (A) 9α,11β-DICHLORO-17α-HYDROXY-19-NOR-PROGESTERONE One gram of 17α-hydroxy-19-nor-4,9(11)-pregnadiene-3,20-dione, prepared as in Example 26B, is dissolved in 30 ml. of carbon tetrachloride and at −20° C., there is added 220 mg. of chlorine dissolved in 30 ml. of carbon tetrachloride in the presence of 0.75 ml. of pyridine. The mixture is stirred at −20° C. for 15 minutes, then allowed to warm to room temperature over a period of one-half hour. The solution is filtered and the filtrate concentrated in vacuo to a residue which is crystallized from acetone-hexane to give 9α,11β-dichloro-17α-hydroxy-19-norprogesterone.

(B) 9α,11β-DICHLORO-17α-HYDROXY-19-NOR-PROGESTERONE 17-ACETATE

The 9α,11β-dichloro-17α-hydroxy-19-norprogesterone of Example 27A is esterified with acetic acid in the presence of trifluoroacetic anhydride and the resultant product isolated and purified in the manner described in Example 1 to give 9α,11β-dichloro-17α-hydroxy-19-norprogesterone 17-acetate.

Similarly, by substituting other lower alkanoic acids such as propionic, butyric or caproic acid for acetic acid in the above procedure, the corresponding 17-esters are prepared, that is, the 17-propionate, 17-butyrate and 17-caproate of 9α,11β-dichloro-17α-hydroxy-19-norprogesterone.

EXAMPLE 28

9α,11β-Dichloro-17α-Hydroxy-19-Norprogesterone 17-(β-Cyclopentylpropionate)

9α,11β - dichloro-17α-hydroxy-19-norprogesterone, the compound of Example 27A, is esterified by means of β-cyclopentylpropionic acid and β-cyclopentylpropionic anhydride under an atmosphere of nitrogen in the presence of p-toluenesulfonic acid in the manner of Example 3 to give 9α,11β-dichloro-17α-hydroxy-19-norprogesterone 17-(β-cyclopentylpropionate).

EXAMPLE 29

9α-Bromo-11β-Chloro-17α-Hydroxy-19-Norprogesterone 17-Acetate (A) 9α-BROMO-11β-CHLORO-17α-HYDROXY-19-NORPROGESTERONE 500 mg. of 17α-hydroxy-19-nor-4,9(11)-pregnadiene-3,20-dione, the compound of Example 26B, is added to a solution of 220 mg. of N-bromoacetamide and 2 g. of lithium chloride in 20 ml. of glacial acetic acid. The mixture is stirred at room temperature for about 30 minutes then poured into ice-water. A solid product separates which is filtered, washed well with water and crystallized from methylene chloride-pentane to give 9α-bromo-11β-chloro-17α-hydroxy-19-norprogesterone.

(B) 9α-BROMO-11β-CHLORO-17α-HYDROXY-19-NORPROGESTERONE 17-ACETATE

In the manner described in Example 1, 9α-bromo-11β-chloro-17α-hydroxy-19-norprogesterone, the compound of Example 29A, is esterified with acetic acid in the presence of trifluoroacetic anhydride to give 9α-bromo-11β-chloro-17α-hydroxy-19-norprogesterone 17-acetate.

In a similar fashion, other lower alkanoic acid esters of the compound of Example 29A are prepared by substituting suitable acids such as propionic, butyric and caproic for acetic acid in the above procedure.

EXAMPLE 30

9α-Bromo-11β-Fluoro-17α-Hydroxy-19-Norprogesterone 17-Acetate (A) 9α-BROMO-11β-FLUORO-17α-HYDROXY-19-NORPROGESTERONE In the manner described in Example 6, 250 mg. of 17α-hydroxy-19-nor-4,9(11)-pregnadiene-3,20-dione (the compound of Example 26B) is reacted with 110 mg. of N-bromoacetamide in 50 ml. of diethylacetic acid and a solution of 250 mg. of hydrogen fluoride in 2 ml. of a chloroform-tetrahydrofuran mixture, and the resultant product isolated and purified to give 9α-bromo-11β-fluoro-17α-hydroxy-19-norprogesterone.

(B) 9α-BROMO-11β-FLUORO-17α-HYDROXY-19-NORPROGESTERONE 17-ACETATE

In the manner described in Example 1, 9α-bromo-11β-fluoro - 17α-hydroxy-19-norprogesterone (the compound of Example 30A) is esterified with acetic acid in the presence of trifluoroacetic anhydride to give 9α-bromo-11β-fluoro-17α-hydroxy-19-norprogesterone 17-acetate.

In a similar fashion, by substituting other lower alkanoic acids such as propionic, butyric and caproic for acetic acid in the above procedure, the corresponding 17-lower alkanoates are formed, that is, the 17-propionate, 17-butyrate or 17-caproate respectively of 9α-bromo-11β-fluoro-17α-hydroxy-19-norprogesterone.

EXAMPLE 31

9α-Iodo-11β-Chloro-17α-Hydroxy-19-Norprogesterone 17-Acetate (A) 9α-IODO-11β-CHLORO-17α-HYDROXY-19-NORPROGESTERONE In the manner described in Example 10, 17α-hydroxy-19-nor-4,9(11)-pregnadiene-3,20-dione (the compound of Example 26B), is reacted with iodine monochloride in tetrahydrofuran and the resultant product isolated and purified to give 9α-iodo-11β-chloro-17α-hydroxy-19-norprogesterone.

(B) 9α-IODO-11β-CHLORO-17α-HYDROXY-19-NORPROGESTERONE 17-ACETATE

The 17α-hydroxy-19-norprogesterone of Example 31A is esterified to the corresponding 17-acetoxy compound by means of acetic acid in the presence of trifluoroacetic anhydride in the manner described in Example 1 to give 9α-iodo-11β-chloro-17α-hydroxy-19-norprogesterone 17-acetate.

EXAMPLE 32

17α-Methyl-4,9(11)-Pregnadiene-3,20-Dione (A) 17α-METHYL-21-HYDROXY-4,9(11)-PREGNADIENE-3-20-DIONE 21-METHANESULFONATE A solution of 5 g. of 17α-methyl-11β,21-dihydroxy-4-pregnene-3,20-dione in 100 ml. of pyridine is chilled to 0° C. and a solution of 10 ml. of methanesulfonyl chloride in 20 ml. of chloroform is added dropwise. The mixture is allowed to stand in the ice box for 100 hours, then a little ice is added and the solution diluted with chloroform. The organic solution is washed with water, 5% hydrochloric acid, 5% aqueous sodium bicarbonate, and again with water. The solution is dried over magnesium sulfate, filtered and concentrated in vacuo to a residue which is crystallized twice from acetone-hexane to give 17α-methyl-21-hydroxy-4,9(11)-pregnadiene-3,20-dione 21-methanesulfonate.

(B) 17α-METHYL-4,9(11)-PREGNADIENE-3,20-DIONE

To a solution of 2.0 g. of 17α-methyl-21-hydroxy-4,9(11)-pregnadiene-3,20-dione 21-methanesulfonate (the compound of Example 32A), in 30 ml. of acetic acid is added 4.0 g. of sodium iodide. The mixture is heated on the steam-bath for 30 minutes, then cooled and decolorized by the addition of aqueous sodium bisulfite solution. The solution is then poured into ice water. A precipitate forms which is filtered, washed with water, and crystallized from acetone-hexane to give 17α-methyl-4,9(11)-pregnadiene-3,20-dione.

EXAMPLE 33

9α,11β-Dichloro-17α-Methylprogesterone

One gram of 17α-methyl-4,9(11)-pregnadiene-3,20-dione, the compound of Example 32, is reacted with N-chlorosuccinimide (430 mg.) in the presence of hydrogen chloride and lithium chloride in the manner of Example 4. The resultant product is isolated and purified in the described manner to give 9α,11β-dichloro-17α-methylprogesterone.

EXAMPLE 34

9α-Bromo-11β-Fluoro-17α-Methylprogesterone

In the manner described in Example 6, one gram of 17α-methyl-4,9(11)-pregnadiene-3,20 - dione, the compound of Example 32, is reacted with N-bromoacetamide (450 mg.) and hydrogen fluoride in diethylacetic acid. The isolated product is crystallized from methylene chloride-pentane to give 9α-bromo-11β-fluoro-17α-methylprogesterone.

EXAMPLE 35

9α-Bromo-11β-Chloro-17α-Methylprogesterone

In the manner described in Example 5, 17α-methyl-4,9(11)-pregnadiene-3,20-dione, the compound of Example 32, is reacted with N-bromoacetamide and hydrogen chloride in the presence of lithium chloride. The product is isolated and purified in the described manner to give 9α-bromo-11β-chloro-17α-methylprogesterone.

EXAMPLE 36

17α-Methyl-1,4,9(11)-Pregnatriene-3,20-Dione

In the manner described in the alternative procedure of Example 15, 17α-methyl-4,9(11)-pregnadiene-3,20-dione is subjected to the action of a culture of *Corynebacterium simplex* and the resultant product isolated and purified to give 17α-methyl-1,4,9(11)-pregnatriene-3,20-dione.

EXAMPLE 37

9α,11β-Dichloro-17α-Methyl-1,4-Pregnadiene-3,20-Dione

The 17α-methylpregnatriene of Example 36 is reacted with N-chlorosuccinimide in the presence of hydrogen chloride and lithium chloride in the manner described in Example 4, and the resultant product isolated and purified in the described manner to give 9α,11β-dichloro-17α-methyl-1,4-pregnadiene-3,20-dione.

EXAMPLE 38

9α-Bromo-11β-Fluoro-17α-Methyl-1,4-Pregnadiene-3,20-Dione

The 17α-methylpregnatriene of Example 36 is reacted with N-bromoacetamide and hydrogen fluoride in diethylacetic acid and the resultant product isolated and purified in the manner of Example 6 to give 9α-bromo-11β-fluoro-17α-methyl-1,4-pregnadiene-3,20-dione.

EXAMPLE 39

9α-Chloro-11β-Fluoro-17α-Methyl-1,4-Pregnadiene-3,20-Dione

The 17α-methylpregnatriene of Example 36 is reacted with N-chlorosuccinimide and hydrogen fluoride and the resultant product isolated and purified in the described manner of Example 11 to give 9α-chloro-11β-fluoro-17α-methyl-1,4-pregnadiene-3,20-dione.

EXAMPLE 40

9α,11β-Dibromo-17α-Methyl-1,4-Pregnadiene-3,20-Dione

In the manner described in Example 9, 17α-methyl-1,4,9(11)-pregnatriene-3,20-dione, the compound of Example 36, is brominated by means of N-bromoacetamide in the presence of hydrogen bromide and lithium bromide and the product isolated and purified to give 9α,11β-dibromo-17α-methyl-1,4-pregnadiene-3,20-dione.

EXAMPLE 41

9α-Iodo-11β-Chloro-17α-Methylprogesterone

In the manner described in Example 10, 500 mg. of 17α-methyl-4,9(11)-pregnadiene - 3,20 - dione, the compound of Example 32, is reacted with 250 mg. of iodine monochloride and the resultant product isolated and purified to give 9α-iodo-11β-chloro-17α-methylprogesterone.

EXAMPLE 42

17α-Bromo-4,9(11)-Pregnadiene-3,20-Dione (A) 17α-BROMO-11B-HYDROXYPROGESTERONE 17α-bromoprogesterone is subjected to the action of a culture of *Curvularia lunata* in the manner described in Example 26A and the resultant product isolated in the described manner and crystallized twice from ethylacetate to give 17α-bromo-11β-hydroxyprogesterone.

(B) 17α-BROMO-4,9(11)-PREGNADIENE-3,20-DIONE

A mixture of 2 g. of 17α-bromo-11β-hydroxyprogesterone, prepared as in Example 42A, and 4 g. of dry lithium bromide in 50 ml. of glacial acetic acid is refluxed under anhydrous conditions for 30 minutes. The solution is then cooled and poured into ice water. A solid precipi-

19 tates which is filtered washed well with water and recrystallized twice from acetone-hexane to give 17α-bromo-4,9(11)-pregnadiene-3,20-dione.

EXAMPLE 43

9α,11β-Dichloro-17α-Bromoprogesterone

One gram of 17α-bromo-4,9(11)-pregnadiene-3,20-dione, the compound of Example 42, is reacted with 370 mg. of N-chlorosuccinimide in the presence of hydrogen chloride and lithium chloride in the manner described in Example 4. The resultant product is isolated in the described manner and crystallized from methylene chloride-hexane to give 9α,11β-dichloro-17α-bromoprogesterone.

EXAMPLE 44

9α,17α-Dibromo-11β-Chloroprogesterone 500 mg. of the 17α-bromopregnadiene of Example 42 is reacted with 190 mg. of N-bromoacetamide in the presence of hydrogen chloride and lithium chloride in the manner described in Example 5. The resultant product is isolated in the described manner and crystallized from acetone-hexane to give 9α,17α-dibromo-11β-chloroprogesterone.

EXAMPLE 45

9α-Chloro-11β-Fluoro-17α-Bromoprogesterone 500 mg. of the 17α-bromopregnadiene of Example 42 is reacted with 180 mg. of N-chlorosuccinimide in the presence of hydrogen fluoride in the manner described in Example 11. The resultant crude product is chromatographed on silica gel and the material eluted with 30% ether in hexane is crystallized twice from methylene chloride-pentane to give 9α-chloro-11β-fluoro-17α-bromoprogesterone.

EXAMPLE 46

17α-Bromo-1,4,9(11)-Pregnatriene-3,20-Dione

The 17α-bromo-4,9(11)-pregnadiene-3,20-dione of Example 42 is subjected to the action of a culture of *Corynebacterium simplex* in the manner described in the alternative procedure of Example 15 and the resultant product isolated and purified in the described manner to give 17α-bromo-1,4,9(11)-pregnatriene-3,20-dione.

EXAMPLE 47

9α,11β-Dichloro-17α-Bromo-1,4-Pregnadiene-3,20-Dione

The 17α-bromopregnatriene of Example 46 is reacted with N-chlorosuccinimide in the presence of hydrogen chloride and lithium chloride in the manner described in Example 4. The resultant product is isolated and purified in the described manner to give 9α,11β-dichloro-17α-bromo-1,4-pregnadiene-3,20-dione.

Alternatively, the compound of this example is prepared from 9α,11β-dichloro-17α-bromoprogesterone, the compound of Example 43, with the aid of a culture of *Corynebacterium simplex* in the manner of the alternative procedure of Example 15.

EXAMPLE 48

9α,17α-Dibromo-11β-Chloro-1,4-Pregnadiene-3,20-Dione

17α-bromo-1,4,9(11)-pregnatriene-3,20-dione, prepared as in Example 42, is reacted with lithium chloride, N-bromoacetamide and hydrogen chloride, and the resultant product isolated and purified in the manner described in Example 5 to give 9α,17α-dibromo-11β-chloro-1,4-pregnadiene-3,20-dione.

Alternatively, the compound of this example is prepared from 9α,17α-dibromo-11β-chloroprogesterone, the compound of Example 44, with the aid of a culture of *Corynebacterium simplex* in the manner described in the alternative procedure of Example 15.

EXAMPLE 49

9α,17α-Dibromo-11β-Fluoro-1,4-Pregnadiene-3,20-Dione

In the manner described in Example 6, 17α-bromo-1,4,9(11)-pregnatriene-3,20-dione, the compound of Example 42, is reacted with N-bromoacetamide and hydrogen fluoride in diethylacetic acid. The resultant product is isolated and purified in the described manner to give 9α,17α-dibromo-11β-fluoro-1,4-pregnadiene-3,20-dione.

EXAMPLE 50

9α,11β,17α-Tribromo-1,4-Pregnadiene-3,20-Dione

In the manner described in Example 9, 17α-bromo-1,4,9(11)-pregnatriene-3,20-dione (the compound of Example 42) is reacted with lithium bromide, N-bromoacetamide and hydrogen bromide in acetic acid and the resultant product isolated and purified to give 9α,11β,17α-tribromo-1,4-pregnadiene-3,20-dione.

EXAMPLE 51

17α-Chloroprogesterone (A) 17α-HYDROXY-5α,6β,17α-TRICHLORO-ALLOPREGNANE-20-ONE 3-ACETATE The requisite starting compound, 5,17(20)-pregnadiene-3β,20-diol diacetate, is prepared as follows.

To a solution of 5 g. of 3β-hydroxy-5-pregnene-20-one 3-acetate in 250 ml. of acetic anhydride there is added 1.5 g. of p-toluenesulfonic acid. The mixture is slowly concentrated to about one-fourth the original volume by distillation over a six hour period. The remaining solvent is then distilled in vacuo. The resulting residue is taken up in ether, washed with water, then with aqueous sodium bicarbonate solution and then again with water. The ether solution is dried over magnesium sulfate, filtered, then passed through a column of Florisil in ether. The eluate is concentrated to a residue which crystallizes upon the addition of hexane. The crystalline material is filtered and air dried to give 5,17(20)-pregnadione-3β,20-diol diacetate.

The 5-pregnene diacetate prepared as described above is dissolved in 100 ml. of carbon tetrachloride, 2 ml. of pyridine is added, the solution chilled to −20° C. and then there is added dropwise a solution of 1 g. of chlorine dissolved in 8.4 ml. of carbon tetrachloride. The mixture is stirred at −20° C. for one-half hour, then allowed to come to room temperature. The solution is diluted with methylene chloride, washed with water, 5% sodium bicarbonate, 5% hydrochloric acid and again with water, dried over magnesium sulfate, then concentrated in vacuo to a residue which is crystallized from acetone-hexane to give 3β-hydroxy-5α,6β,17α-trichloroallopregane-20-one 3-acetate.

(B) 3β-HYDROXY-17α-CHLORO-5-PREGNENE-20-ONE 3-ACETATE

A solution of 2 g. of the compound of Example 51A in 50 ml. of methyl ethyl ketone containing 2 g. of sodium iodide is refluxed under nitrogen for 2 hours, then poured into cold water. A precipitate forms which is filtered, washed with water and crystallized from ethyl acetate to give 3β-hydroxy-17α-chloro-5-pregnene-20-one 3-acetate.

(C) 17α-CHLOROPROGESTERONE

3β-hydroxy-17α-chloro-5-pregnene-20-one 3-acetate, prepared as in Example 51B, is subjected to the action of a culture of *Flavobacterium dehydrogenans* (Rutgers Collection No. 150) as follows.

The culture of the organism is prepared by propagating it in a nutrient agar medium at 30° C. for 24 to 72 hours. During incubation, the inoculated tube is exposed to light with the resultant development of a yellow pigment characteristic of the species. The developed culture is rinsed from an agar slant under sterile conditions into a sterile medium of pH 6.8 and having the following composition:

Yeast extract (Difco) _____ 10 gm.
Potassium phosphate monobasic _____ 4.48 gm.
Sodium phosphate dibasic _____ 4.68 gm.
Tap water _____ to 1 liter.

This culture medium has previously been autoclaved, at 15 lb. pressure, for twenty minutes to obtain aseptic conditions, and cooled. The variant is grown in the medium under constant illumination, using the visible range of the spectrum. The incubation temperature is maintained at about 33° C. and is conducted under aerobic conditions. Aeration is accomplished by agitation and/or blowing air through the culture medium.

After the organism has grown for 12 to 24 hours (or longer, if desired), 100 ml. of the growing culture are introduced into each of ten flasks, and to each flask are added 200 mg. of 3β-hydroxy-17α-chloro-5-pregnene-20-one 3-acetate dissolved in a minimum volume of ethanol. The reaction mixtures are then shaken at 30° C. for 12 to 72 hours. The reaction is stopped when paper chromatography indicates that there is no more starting material.

The contents of the flasks are combined and extracted with methylene chloride. The extracts are concentrated and the residue is crystallized from acetone-hexane yielding 17α-chloroprogesterone.

EXAMPLE 52

*17α-Chloro-4,9(11)-Pregnadiene-3,20-Dione*

(A) 11β-HYDROXY-17α-CHLOROPROGESTERONE

17α-chloroprogesterone, prepared as described in Example 51, is subjected to the action of a culture of *Curvularia lunata* and the resultant product isolated in the manner described in Example 26A to give a residue which is crystallized from ethyl acetate to give 11β-hydroxy-17α-chloroprogesterone.

(B) 17α-CHLORO-4,9(11)-PREGNADIENE-3,20-DIONE

11β-hydroxy-17α-chloroprogesterone, prepared as in Example 52A, is reacted with lithium bromide in glacial acetic acid in the manner described in Example 42B and the resultant product isolated and purified to give 17α-chloro-4,9(11)-pregnadiene-3,20-dione.

EXAMPLE 53

*9α,11β-17α-Trichloroprogesterone*

One gram of 17α-chloro-4,9(11)-pregnadiene-3,20-dione, prepared as in Example 52B, is reacted with 390 mg. of N-chlorosuccinimide in the presence of hydrogen chloride and lithium chloride in the manner described in Example 4. The resultant product is isolated in the described manner and crystallized from acetone-hexane to give 9α,11β,17α-trichloroprogesterone.

EXAMPLE 54

*9α-Bromo-11β,17α-Dichloroprogesterone*

One gram of 17α-chloro-4,9(11)-pregnadiene-3,20-dione, the compound of Example 52B, is reacted with 400 mg. of N-bromoacetamide in the presence of hydrogen chloride and lithium chloride according to the procedure of Example 5. The resultant product is isolated in the described manner and crystallized twice from methylene chloride-pentane to give 9α-bromo-11β,17α-dichloroprogesterone.

EXAMPLE 55

*9α-Bromo-11β-Fluoro-17α-Chloroprogesterone*

In the manner described in Example 6, the 4,9(11)-pregnadiene of Example 52B is reacted with N-bromoacetamide and hydrogen fluoride in diethyl acetic acid and the resultant product isolated and purified to give 9α-bromo-11β-fluoro-17α-chloroprogesterone.

EXAMPLE 56

*9α,17α-Dichloro-11β-Fluoroprogesterone*

In the manner described in Example 11, the 4,9(11)-pregnadiene of Example 52B is reacted with N-chlorosuccinimide and hydrogen fluoride and the resultant product isolated and purified to give 9α,17α-dichloro-11β-fluoroprogesterone.

EXAMPLE 57

*17α-Chloro-1,4,9(11)-Pregnatriene-3,20-Dione*

17α-Chloro-4,9(11)-pregnadiene-3,20-dione, the compound of Example 52B, is subjected to the action of a culture of *Corynebacterium simplex* in the manner described in the alternative procedure of Example 15. The resultant product is isolated and purified in the described manner to give 17α-chloro-1,4,9(11)-pregnatriene-3,20-dione.

EXAMPLE 58

*9α,11β,17α-Trichloro-1,4-Pregnadiene-3,20-Dione*

In the manner described in Example 4, 17α-chloro-1,4,9(11)-pregnatriene-3,20-dione, the compound of Example 57, is reacted with N-chlorosuccinimide in the presence of hydrogen chloride and lithium chloride and the resultant product isolated and purified to give 9α,11β,17α-trichloro-1,4-pregnadiene-3,20-dione.

Alternatively, the compound of this example is prepared from 9α,11β,17α-trichloroprogesterone, the compound of Example 53, with the aid of a culture of *Corynebacterium simplex* in the manner described in the alternative procedure of Example 15.

EXAMPLE 59

*9α-Bromo-11β,17α-Dichloro-1,4-Pregnadiene-3,20-Dione*

In the manner described in Example 5, the 17α-chloropregnatriene of Example 57 is reacted with N-bromoacetamide in the presence of hydrogen chloride and lithium chloride, and the resultant product isolated and purified to give 9α-bromo-11β,17α-dichloro-1,4-pregnadiene-3,20-dione.

Alternatively, 9α - bromo - 11β,17α-dichloroprogesterone, prepared as in Example 54, is subjected to the action of a culture of *Corynebacterium simplex* in the manner described in the alternative procedure of Example 15 to give 9α-bromo-11β,17α-dichloro-1,4-pregnadiene-3,20-dione.

EXAMPLE 60

*9α-Bromo-11β-Fluoro-17α-Chloro-1,4-Pregnadiene-3,20-Dione*

In the manner described in the alternative procedure of Example 15, 9α-bromo-11β-fluoro-17α-chloroprogesterone, the compound of Example 55, is subjected to the action of a culture of *Corynebacterium simplex* and the resultant product isolated and purified to give 9α-bromo-11β-fluoro-17α-chloro-1,4-pregnadiene-3,20-dione.

EXAMPLE 61

*9α,17α-Dichloro-11β-Fluoro-1,4-Pregnadiene-3,20-Dione*

In the manner described in the alternative procedure of Example 15, 9α,17α-dichloro-11β-fluoroprogesterone, is subjected to the action of a culture of *Corynebacterium simplex* and the resultant product isolated and purified to give 9α,17α-dichloro-11β-fluoro-1,4-pregnadiene-3,20-dione.

EXAMPLE 62

*9α,11β-Dibromo-17α-Chloro-1,4-Pregnadiene-3,20-Dione*

In the manner described in Example 9, 17α-chloro-1,4,9(11)-pregnatriene-3,20-dione, is reacted with N-bromoacetamide in the presence of lithium bromide and hydrogen bromide and the resultant product isolated and purified to give 9α,11β-dibromo-17α-chloro-1,4-pregnadiene-3,20-dione.

EXAMPLE 63

*9α-Iodo-11β-Chloro-17α-Methyl-1,4-Pregnadiene 3,20-Dione*

In the manner described in the alternative procedure of Example 15 9α-iodo-11β-chloro-17α-methylprogesterone (the compound of Example 41) is subjected to the action of a culture of *Corynebacterium simplex* and the resultant product isolated and purified to give 9α-iodo-11β-chloro-17α-methyl-1,4-pregnadiene-3,20-dione.

EXAMPLE 64

*9α,11β-Dibromo-17α-Methylprogesterone*

17α-methyl-4,9(11)-pregnadiene-3,20-dione (the compound of Example 32B) is reacted with N-bromoacetamide, lithium bromide and hydrogen bromide and the resultant product isolated and purified in the manner described in Example 9 to give 9α,11β-dibromo-17α-methylprogesterone.

EXAMPLE 65

*9α-Iodo-11β,17α-Dibromoprogesterone*

17α-bromo-4,9(11)-pregnadiene-3,20-dione (the compound of Example 42B) is reacted with lithium bromide, hydrogen bromide and N-iodo-succinimide in the manner described in Example 25. The resultant product is isolated and purified in the described manner to give 9α-iodo-11β,17α-dibromoprogesterone.

EXAMPLE 66

*9α,11β,17α-Tribromoprogesterone*

In the manner of Example 9, 17α-bromo-4,9(11)-pregnadiene-3,20-dione (the compound of Example 42B) is reacted with N-bromoacetamide, lithium bromide and hydrogen bromide, and the resultant product isolated and purified to give 9α,11β,17α-tribromoprogestrone.

EXAMPLE 67

*9α-Iodo-11β,17α-Dibromo-1,4-Pregnadiene-3,20-Dione*

9α-Iodo-11β,17α-dibromoprogesterone (the compound of Example 65) is subjected to the action of a culture of *Corynebacterium simplex* and the resultant product isolated and purified in the manner described in the alternative procedure of Example 15 to give 9α-iodo-11β,17α-dibromo-1,4-pregnadiene-3,20-dione.

EXAMPLE 68

*9α,11β-Dibromo-17α-Hydroxy-19-Norprogesterone 17-Acetate*

(A) 9α,11β-DIBROMO-17α-HYDROXY-19-NORPROGESTERONE

To a solution of 1 g. of 17α-hydroxy-4,9(11)-19-norpregnadiene-3,20-dione (the compound of Example 26B) and 4 g. of lithium bromide in 50 ml. of acetic acid is added 420 mg. of N-bromoacetamide. The mixture is stirred at room temperature for one hour, then is poured into ice-water. A solid separates which is filtered, washed with water, and crystallized from acetone-hexane to give 9α,11β-dibromo-17α-hydroxy-19-norprogesterone.

(B) 9α,11β-DIBROMO-17α-HYDROXY-19-NORPROGESTERONE 17-ACETATE

The dibromo-17α-progesterone of Example 68A is esterified in the manner described in Example 1 to give 9α,11β-dibromo-17α-hydroxy - 19 - norprogesterone 17-acetate.

EXAMPLE 69

*9α,11β-Dichloro-17α-Hydroxyprogesterone 17-Acetate*

(A) 9α,11β-DICHLORO-17α-HYDROXYPROGESTERONE

One gram of 17α-hydroxy-4,9(11)-pregnadiene-3,20-dione is reacted with 220 mg. of chlorine in carbon tetrachloride in the presence of pyridine in the manner described in the alternative procedure of Example 4 to give 9α,11β-dichloro-17α-hydroxyprogesterone.

$$\lambda_{max.}^{MeOH}\ 238\ m\mu$$

(B) 9α,11β-DICHLORO-17α-HYDROXYPROGESTERONE 17-ACETATE

In the manner described in Example 14, 9α,11β-dichloro-17α-hydroxyprogesterone (the compound of Example 69A) is esterified by means of trifluoroacetic anhydride in acetic acid to give 9α,11β-dichloro-17α-hydroxyprogesterone 17-acetate.

In similar manner, by substituting other lower alkanoic acids, such as butyric and valeric, for acetic acid in the esterification procedure, other lower alkanoyl esters are prepared such as the 17-butyrate and 13-valerate of 9α,11β-dichloro-17α-hydroxyprogesterone.

Alternatively, the compound of this example is prepared according to the following procedure.

(C) 9α,11β-DICHLORO-17α-HYDROXYPROGESTERONE 17-ACETATE

One gram of 17α-hydroxy-4,9(11)-pregnadiene-3,20-dione 17-acetate (the compound of Example 1) and 850 mg. of p-iodotoluene dichloride are dissolved in 20 ml. of methylene chloride. The solution is stirred at room temperature for 5 hours, then concentrated in vacuo to a residue which is crystallized from acetone-hexane to give 9α,11β-dichloro-17α-hydroxyprogesterone 17-acetate.

EXAMPLE 70

*9α-Bromo-11β-Chloro-17α-Hydroxyprogesterone 17-Aceate*

(A) 9α-BROMO-11β-CHLORO-17α-HYDROXYPROGESTERONE

One gram of 17α-hydroxy-4,9(11)-pregnadiene-3,20-dione and 4 g. of lithium chloride are dissolved in 50 ml. of glacial acetic acid. There is first added 420 mg. of N-bromoacetamide and then 111 mg. of hydrogen chloride in 40 ml. of acetic acid. The mixture is stirred at room temperature for about 30 minutes then is poured into ice-water with stirring and the resultant solid is filtered, washed with water, and crystallized from acetone-hexane to give 9α-bromo-11β-chloro-17α-hydroxyprogesterone, $$\lambda_{max.}^{MeOH}\ 241\ m\mu$$

(B) 9α-BROMO-11β-CHLORO-17α-HYDROXYPROGESTERONE 17-ACETATE

The 17α-hydroxy compound of Example 70A is esterified with acetic acid in the presence of trifluoroacetic anhydride in the manner of Example 14 to give 9α-bromo-11β-chloro-17α-hydroxyprogesterone 17-acetate.

In similar fashion, by substituting other lower alkanoic acids such as butyric and valeric for acetic acid in the esterification procedure, other lower alkanoyl esters are prepared, such as the 17-butyrate and 17-valerate of 9α-bromo-11β-chloro-17α-hydroxyprogesterone.

EXAMPLE 71

*17α-Hydroxy-1,9(11)-Allopregnadiene-3,20-Dione 17-Acetate*

(A) 11β,17α-DIHYDROXY-1-ALLOPREGNENE-3,20-DIONE 17-ACETATE

In the manner described in Example 26A, 17α-hydroxy-1-allopregnene-3,20-dione 17-acetate is subjected to the action of a culture of the organism *Curvularia lunata*. The resultant product is isolated and purified in the described manner to give 11β,17α-dihydroxy-1-allopregnene-3,20-dione 17-acetate.

(B) 17α-HYDROXY-1,9(11)-ALLOPREGNADIENE-3,20-DIONE 17-ACETATE

The 11β-hydroxy allopregnene of Example 71A is reacted with methanesulfonyl chloride in pyridine and the resultant product isolated and purified in the manner described in Example 26B to give 17α-hydroxy-1,9(11)-allopregnadiene-3,20-dione 17-acetate.

EXAMPLE 72

*9α,11β-Dichloro-17α-Hydroxy-1-Allopregnene-3,20-Dione 17-Acetate*

17α - hydroxy - 1,9(11)-allopregnadiene-3,20-dione 17-acetate (the compound of Example 71) is chlorinated with chlorine in carbon tetrachloride in the presence of pyridine and the resultant product isolated and purified in the manner described in Example 27A to give 9α,11β-dichloro-17α-hydroxy-1-allopregnene-3,20-dione 17-acetate.

EXAMPLE 73

*9α-Bromo-11β-Chloro-17α-Hydroxy-1-Allopregnene-3,20-Dione 17-Acetate*

17α - hydroxy - 1,9(11)-allopregnadiene-3,20-dione 17-acetate (the compound of Example 71) is reacted with 4 g. of lithium chloride, 420 mg. of N-bromoacetamide and anhydrous hydrogen chloride in acetic acid in the manner of Example 5. The resultant product is isolated and purified in the described manner to give 9α-bromo-11β-Chloro - 17α - hydroxy-1-allopregnene-3,20-dione 17-acetate.

EXAMPLE 74

*9α,11β-Dichloro-17α-Hydroxy-1,4-Pregnadiene-3,20-Dione 17-Acetate*

One gram of 9α,11β-dichloro-17α-hydroxy-1-allopregnene-3,20-dione 17-acetate (the compound of Example 72) and 0.3 g. of selenium dioxide in 50 ml. of t-butyl alcohol and 1 ml. of acetic acid are refluxed under an atmosphere of nitrogen for 24 hours. The reaction mixture is filtered through supercel and the filtrate poured into water. A solid separates which is filtered, washed with water and crystallized from acetone-hexane to give 9α,11β-dichloro - 17α - hydroxy-1,4-pregnadiene-3,20-dione 17-acetate.

EXAMPLE 75

*17α-Methyl-1-Allopregnene-3,20-Dione*

(A) 17α-METHYLALLOPREGNANE-3,20-DIONE

A solution of 1.0 g. of 17α-methylprogesterone in 25 ml. of tetrahydrofuran is added in a slow stream with stirring to a solution of 400 mg. of lithium metal in 200 ml. of liquid ammonia chilled to about −70° C. in a Dry Ice-acetone bath. The reaction mixture is allowed to stir for 2 minutes, then sufficient solid ammonium chloride is added to discharge the blue color. The solution is allowed to evaporate to a residue. Water is added to the residue and the mixture extracted with ether. The extracts are combined and washed with water, dried over magnesium sulfate, filtered, and evaporated to a residue which is crystallized from acetone-hexane to give 17α-methylallopregnane-3,20-dione.

(B) 2-BROMO-17α-METHYLALLOPREGNANE-3,20-DIONE

To a solution of 2.0 g. of the allopregnane of Example 75A in 100 ml. of acetic acid is added a drop of hydrogen bromide in acetic acid solution, followed by the dropwise addition, with stirring, of a solution of 1.0 g. of bromine in 36 ml. of acetic acid. The solution is stirred for a few minutes until the bromine color is discharged, and then diluted with cold water. A solid precipitate forms which is filtered and crystallized from acetone-ether to give 2-bromo-17α-methylallopregnane-3,20-dione.

(C) 17α-METHYL-1-ALLOPREGNENE-3,20-DIONE 1.5 grams of the 2-bromo compound of Example 75B is refluxed in 30 ml. of collidine for one hour. The mixture is diluted with chloroform and the layers are separated. The organic layer is washed with 5% aqueous hydrochloric acid and water, dried over magnesium sulfate, filtered, and evaporated to a residue which is crystallized from acetone-hexane to give 17α-methyl-1-allopregnene-3,20-dione.

EXAMPLE 76

*17α-Methyl-1,9(11)-Allopregnadiene-3,20-Dione*

(A) 11β-HYDROXY-17α-METHYL-1-ALLOPREGNENE 3,20-DIONE

17α-Methyl-1-allopregnene-3,20-dione (the compound of Example 75) (2.0 g.) is 11β-hydroxylated by fermentation with *Curvularia lunata* (N.R.R.L. 2380) in the manner of Example 26. The product is isolated in the described manner and crystallized from acetone-hexane to give 11β-hydroxy-17α-methyl-1-allopregnene-3,20-dione.

(B) 17α-METHYL-1-,9(11)-ALLOPREGNADIENE-3,20-DIONE

The 11β-hydroxy compound of Example 76A (2.0 g.) is dehydrated by treatment with methanesulfonyl chloride in pyridine in the manner described in Example 26B. The product is isolated in the described manner and crystallized from acetone-hexane to give 17α-methyl-1,9(11)-allopregnadiene-3,20-dione.

EXAMPLE 77

*9α,11β-Dichloro-17α-Methyl-1-Allopregnene-3,20-Dione*

17α-Methyl-1,9(11)-allopregnadiene-3,20-dione (the compound of Example 76) is chlorinated with chlorine in carbon tetrachloride in the presence of pyridine in the manner of Example 27A. The resultant product is isolated and purified in the described manner to give 9α,11β-dichloro-17α-Methyl-1-allopregnene-3,20-dione.

EXAMPLE 78

*9α-Bromo-11β-Chloro-17α-Methyl-1-Allopregnene-3,20-Dione*

17α-methyl-1,9(11)-allopregnadiene-3,20-dione (the compound of Example 76) is reacted with 4 g. of lithium chloride, 420 mg. of N-bromo-acetamide and anhydrous hydrogen chloride in acetic acid in the manner of Example 5. The resultant product is isolated and purified in the described manner to give 9α-bromo-11β-chloro-17α-methyl-1-allopregnene-3,20-dione.

EXAMPLE 79

*9α,11β-Dichloro-17α-Methyl-1,4-Pregnadiene-3,20-Dione*

One gram of 9α,11β-dichloro-17α-methyl-1-allopregnene-3,20-dione (the compound of Example 78) is reacted with 0.3 g. of selenium dioxide in 50 ml. of t-butyl alcohol and 1 ml. of acetic acid under nitrogen in the manner described in Example 74. The resultant product is isolated and purified in the described manner to give 9α,11β-dichloro-17α-methyl-1,4-pregnadiene-3,20-dione.

EXAMPLE 80

*9α-11β-Dichloro-17α-Hydroxy-Allopregnene-3,20-Dione*

(A) 17α-HYDROXY-1,9(11)-ALLOPREGNADIENE-3,20-DIONE

A solution of 1 g. of 17α-hydroxy-1,9(11)-allopregnadiene-3,20-dione 17-acetate (the compound of Example 71) in 100 ml. of a 3:1 methanol-chloroform mixture is chilled in ice and there is added dropwise 52 ml. of 0.1 Normal sodium hydroxide solution (1 equivalent). The reaction mixture is stirred at 0° C. for 10 minutes, then diluted with water and extracted with methylene chloride. The organic layer is washed with water, dried over magnesium sulfate, filtered and evaporated to a residue which is crystallized from acetone-hexane to give 17α-hydroxy-1,9(11)-allopregnadiene-3,20-dione.

(B) 9α,11β-DICHLORO-17α-HYDROXY-1-ALLO-PREGNENE-3,20-DIONE

17α-hydroxy-1,9(11)-allopregnadiene-3,20-dione (prepared as in Example 80A) is chlorinated with chlorine in carbon tetrachloride in the presence of pyridine and the resultant product isolated and purified in the manner described in Example 27 to give 9α,11β-dichloro-17α-hydroxy-1-allopregnene-3,20-dione.

Alternatively, the compound of this example is prepared from 9α,11β-dichloro-17α-hydroxy-1-allopregnene-3,20-dione (the compound of Example 72) by reaction with one equivalent of 0.1 Normal sodium hydroxide solution in the manner described in Example 80A to give 9α,11β-dichloro-17α-hydroxy-1-allopregnene-3,20-dione.

EXAMPLE 81

*9α,11β-Dichloro-17α-Hydroxy-1-Allopregnene-3,20-Dione 17-Caproate*

In the manner described in Example 2, 9α,11β-Dichloro-17α-hydroxy-1-allopregnene-3,20-dione (the compound of Example 80) is reacted with caproic acid and trifluoroacetic anhydride to give 9α,11β-dichloro-17α-hydroxy-1-allopregnene-3,20-dione 17-caproate.

In similar fashion, other lower alkanoic acid esters of the compound of Example 80 are prepared by substituting suitable acids such as propionic and butyric for caproic acid in the above procedure to give the 17-propionate and 17-butyrate respectively of 9α,11β-dichloro-17α-hydroxy-1-allopregnene-3,20-dione.

We claim:

1. A compound selected from the group consisting of 17α-R-9(11)-dehydroprogesterone, 17α-R-1,9(11)-bisdehydroprogesterone and 17α-R-11β-hydroxyprogesterone wherein R is a halogen having an atomic weight greater than 19 and less than 126.
2. 17α-Bromo-9(11)-dehydroprogesterone.
3. 17α-Chloro-9(11)-dehydroprogesterone.
4. 11β-Hydroxy-17α-bromoprogesterone.
5. 11β-Hydroxy-17α-chloroprogesterone.
6. 17α-Chloro-1,9(11)-bisdehydroprogesterone.

References Cited in the file of this patent

UNITED STATES PATENTS 2,838,550     Lyttle et al. _____ June 10, 1958